(12) United States Patent
Kumar et al.

(10) Patent No.: US 9,310,900 B1
(45) Date of Patent: Apr. 12, 2016

(54) STYLUS TESTING SYSTEM

(71) Applicant: Amazon Technologies, Inc., Reno, NV (US)

(72) Inventors: Arun Sathya Narayana Kumar, Cupertino, CA (US); Bela Incze, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/486,715

(22) Filed: Sep. 15, 2014

(51) Int. Cl.
*G06F 3/041* (2006.01)
*G06F 3/0354* (2013.01)
*G06F 11/00* (2006.01)

(52) U.S. Cl.
CPC ............ *G06F 3/03545* (2013.01); *G06F 3/041* (2013.01); *G06F 11/00* (2013.01)

(58) Field of Classification Search
USPC .......................................... 345/173, 174, 182
See application file for complete search history.

(56) References Cited

U.S. PATENT DOCUMENTS

| | | | | |
|---|---|---|---|---|
| 6,681,333 | B1 * | 1/2004 | Cho | 713/300 |
| 2003/0189555 | A1 * | 10/2003 | Yamashita | 345/173 |
| 2013/0278550 | A1 * | 10/2013 | Westhues | 345/174 |

* cited by examiner

*Primary Examiner* — Jason Olson
*Assistant Examiner* — Deeprose Subedi
(74) *Attorney, Agent, or Firm* — Lowenstein Sandler LLP

(57) ABSTRACT

Systems and methods for testing a stylus are described. A processing device determines that a stylus is disposed in a holder above a touch panel that generates position data for each point of contact between the stylus and the touch panel. In response to such determination, the processing device performs one or more tests of the stylus. The processing device may cause the holder to move the across the surface of the touch panel, receive position data, and compare the position data to reference data to determine operation of the stylus.

19 Claims, 10 Drawing Sheets

STYLUS TESTING SYSTEM

BACKGROUND

A large and growing population of users enjoys entertainment through the consumption of digital media items, such as music, movies, images, electronic books and so on. Users employ various electronic devices to consume such media items. Among these electronic devices are electronic book readers, cellular telephones, personal digital assistants (PDAs), portable media players, tablet computers, netbooks and the like.

Some of these devices may be manipulated by applying a stylus to a touch panel, such as a touchscreen display. The stylus may be a passive stylus which includes a conductive portion but does not transmit a signal to the touch panel or an active stylus which transmits a signal to the touch panel during use. An active stylus may include an active tip which, when used, causes the stylus to transmit a signal to the touch panel, and a passive tip which includes a conductive portion but does does result in the stylus transmitting a signal to the touch panel during use.

During production of a device, or many such devices, the stylus may be tested to determine if it is functioning properly or is defective. Manually testing a number of styluses may be a time-consuming and non-uniform process.

DETAILED DESCRIPTION

A large and growing population of users enjoys entertainment through the consumption of digital media items, such as music, movies, images, electronic books and so on. Users employ various electronic devices to consume such media items. Among these electronic devices are electronic book readers, cellular telephones, personal digital assistants (PDAs), portable media players, tablet computers, netbooks and the like.

Some of these devices may be manipulated by applying a stylus to a touch panel, such as a touchscreen display. The stylus may be a passive stylus which includes a conductive portion but does not transmit a signal to the touch panel or an active stylus which transmits a signal to the touch panel during use. An active stylus may include an active tip which, when used, causes the stylus to transmit a signal to the touch panel, and a passive tip which includes a conductive portion but does not result in the stylus transmitting a signal to the touch panel during use.

During production of a device, or many such devices, the stylus may be tested to determine if it is functioning properly or is defective. Manually testing a number of styluses may be a time-consuming and non-uniform process. For example, a tester may attempt to draw a line using the stylus and determine if a touch panel output describes a line. However, a tester may not be able to smoothly and quickly move the stylus in a perfectly linear fashion. As another example, a tester may apply different masses to the end of the stylus and determine if the touch panel output reflects the differing applied pressures. However, balancing more than one mass or more than two masses upon the stylus at a time may be difficult.

Described herein are systems and methods for automated testing of styluses. An automated system can quickly and accurately perform a number of tests of a stylus with minimal or no user interaction. By automating the testing process, the amount of time taken to test a stylus may be significantly reduced. Thus, in the same amount of time, a greater number of styluses may be tested to determine if they are functioning properly or are defective. Also, by automating the testing process, the testing process itself is more uniform and the accuracy of the determination of whether the stylus is functioning properly may be increased. The automated testing described below may supplement or replace a manual testing process.

Figure 1:
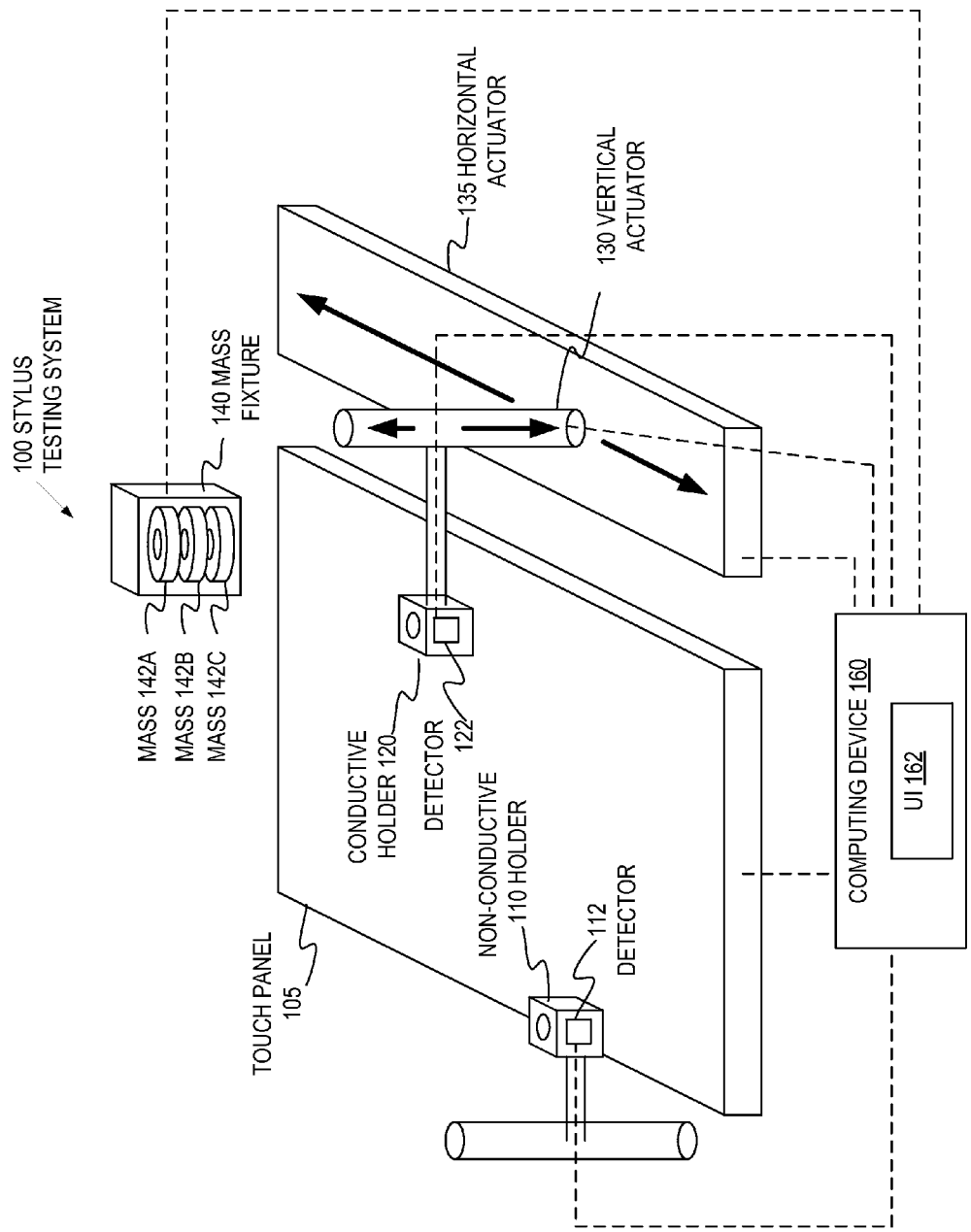
FIG. 1 illustrates an embodiment of a stylus testing system.

FIG. 1 illustrates an embodiment of a stylus testing system 100. The stylus testing system 100 may perform automated testing of one or more styluses. The stylus testing system 100 may include one or more holders to receive a stylus. In FIG. 1, the stylus testing system 100 includes a non-conductive holder 110 and a conductive holder 120. The non-conductive holder 110 can receive a stylus and hold the stylus in a vertical position above a touch panel 105. Similarly, the conductive holder 120 can receive a stylus and hold the stylus in a vertical position above the touch panel 105. In one embodiment, the non-conductive holder 110 is composed of plastic and the conductive holder 120 is composed of metal. Although the non-conductive holder 110 and conductive holder 120 are illustrated as single pieces, it is to be appreciated that each may include more than one holding element.

The non-conductive holder 110 may include a non-conductive holder detector 112 to detect that a stylus is disposed in the non-conductive holder 110. Similarly, the conductive holder 120 may include a conductive holder detector 122 to detect that a stylus is disposed in the conductive holder 122. Although the detectors 112, 122 are illustrated in FIG. 1 as part of their respective holders 110, 120, in other embodiments, the detectors 112, 122 may be separate components. The detectors 112, 122 may be pressure sensors, infrared detectors, light sensors, proximity sensors, or any other kind of device for determining the presence of an object.

The conductive holder 120 is coupled to a vertical actuator 130 that moves the conductive holder 120 (and, if present, a stylus disposed in the conductive holder 120) towards and away from the touch panel 105. The vertical actuator 130 may move the conductive holder 120 to move a stylus disposed in the conductive holder 120 into contact with the touch panel or into a hover position not in contact with the touch panel 105. In the hover position, the stylus may be less than 10 millimeters from the touch panel 105 or between 10 and 15 millimeters from the touch panel 105. The vertical actuator 130 may also move the conductive holder 120 to other positions.

The conductive holder 120 is also coupled to a horizontal actuator 135 that moves the conductive holder 120 across the touch panel 105. Although FIG. 1 illustrates the conductive holder 120 as coupled to the vertical actuator 130 that is coupled to the horizontal actuator 135, other configurations are possible for moving the conductive holder 120. The vertical actuator 130 and horizontal actuator 135 may be linear actuators. The vertical actuator 130 and horizontal actuator 135 may be electro-mechanical actuators, hydraulic actuators, pneumatic actuators, motors, or any other type of moving device.

Although the stylus testing system 100 of FIG. 1 illustrates a horizontal actuator 135 and a vertical actuator 130, the stylus testing system 100 may include only one actuator to move the conductive holder 120 or additional actuators to move the conductive holder 120, the non-conductive holder 110 or a stylus.

The stylus testing system 100 includes a mass fixture 140 that selectively raises and lowers one or more masses 142A-142C or otherwise places the masses 142A-142C on a stylus. The mass fixture 140 may include one or more actuators to selectively raise and lower the masses 142A-142C or otherwise place the masses 142A-142C on a stylus. Although the mass fixture 140 is illustrated with three masses 142A-142C in FIG. 1, it is to be appreciated that the mass fixture 140 may include more or fewer masses. Each of the masses 142A-142C may be a physical object having a predefined mass that may be placed on the stylus so as to apply a predefined pressure upon the touch panel 105 in a known gravitational field.

The stylus testing system 100 includes a computing device 160. As described in detail below with respect to FIG. 8, the computing device 160 may include one or more processing devices, one or more memory devices storing code for executing the various functions of the computing device 160, or one or more input/output devices for providing an interface (e.g., a user interface).

The computing device 160 is coupled to the touch panel 105 and may receive, from the touch panel 105, position data generated by the touch panel 105 indicative of the location of a stylus with respect to the touch panel for each point of contact between the stylus and the touch panel. The position data may, for example, be indicative of the presence of a stylus in contact with a particular location of the touch panel. The computing device 160 may also receive, from the touch panel, pressure data generated by the stylus 190 indicative of a force or pressure applied to the touch panel by the stylus at a particular location. The computing device 160 may receive, from the touch panel, other signals generated by a stylus 190 (first shown in FIG. 2), such as mode data indicating whether the stylus is in a sleep mode or a wake mode. During the various tests described below, the computing device may receive test data from the touch panel 105 including one or more of position data, pressure data, mode data, or other types of data.

The touch panel 105 may be embodied within a consumer electronic device, such as a cellular phone, ebook reader, or tablet. The touch panel 105 may also be a standalone component not installed in an electronic device. For example, the touch panel 105 may be an EVK (Evaluation Kit) touch panel. The touch panel 105 may be, for example, a capacitive touch panel, resistive touch panel, or other type of touch panel. The touch panel 105 may include a number of layers including a glass top layer. The touch panel 105 may be a touchscreen display.

The computing device 160 is also coupled to the non-conductive holder detector 112 and the conductive holder detector 122, and may receive signals indicative of the presence of a stylus in either the non-conductive holder 110 or the conductive holder 120.

The computing device 160 is also coupled to the horizontal actuator 130 and vertical actuator 135 and may transmit signals to the vertical actuator 130 and horizontal actuator 135 to move the conductive holder 120 (and, if present, a stylus disposed in the conductive holder 120). The computing device 160 is also coupled to the mass fixture 140 and may transmit signals to the mass fixture 140 to raise or lower one or more of the masses 142A-142C or otherwise place the masses 142A-142C on a stylus.

The computing device 160 may be coupled to the various components described above in any of number of ways. For example, the computing device 160 may be coupled via a digital input/output (DIO) module such as an RS232 or RS 422 DIO module. The computing device 160 may be coupled (e.g., to the touch panel 105) by a USB-I2C (Universal Serial Bus to Inter-Integrated Circuit) adapter.

For example, as described further below, the computing device 160 may receive a signal from the conductive holder detector 122 indicating that a stylus is held by the conductive holder 120. In response to receiving this signal, the computing device 160 may transmit a signal to the vertical actuator 130 to move the conductive holder such that the stylus touches the touch panel 105. The computing device 160 may then transmit a signal to the horizontal actuator 135 to move the conductive holder 120 (and the stylus 190 disposed therein) across the surface of the touch panel 105 along a linear path ending under the mass fixture 140. While the horizontal actuator 135 moves the stylus, the computing device 160 may receive position data from the touch panel 105 for each point of contact between the stylus 190 and the touch panel 105 along the linear path indicative of the position of the stylus with respect to the touch panel. The computing device 160 may assess the linearity of the path touch data to determine if the position data corresponds to the linear path and, thus, if the stylus is functioning properly. The computing device 160 may transmit a signal to the horizontal actuator 135 to move the conductive holder 120 (and the stylus 190 disposed therein) to position the stylus beneath the mass fixture 140 and, thereafter, transmit a signal to the mass fixture 140 to place a mass onto the stylus. After the mass has been placed on the stylus 190, the computing device 160 may receive pressure data from the touch panel 105 indicative of a pressure applied to the touch panel 105 by the stylus 190. The computing device 160 may analyze the pressure data to determine if the pressure applied by the stylus 190 is within a threshold amount of an expected pressure and, thus, if the stylus is functioning properly. Thus, the stylus testing system 100 may detect the presence of a stylus in a particular position and automatically perform a test upon the stylus.

The computing device 160 may include a user interface 162, such as a graphical user interface, that outputs instructions and/or data to a user. For example, the computing device 160 may output an instruction to a user to place a stylus in the non-conductive holder 110 or to move the stylus from the non-conductive holder 110 to the conductive holder 120. As another example, the computing device 160 may output data to the user indicative of whether the stylus is functioning properly or is defective.

The stylus testing system 100 may be enclosed (or at least partially enclosed) in a housing (not shown). In one embodiment, the housing is approximately 460 millimeters wide, 670 millimeters long, and 450 millimeters tall. In one embodiment, the housing encloses at least the horizontal actuator 130, the vertical actuator 135, and the mass fixture 140. The housing may also enclose at least a majority of the touch panel 105. In one embodiment, the non-conductive holder 110 is not enclosed by the housing for ease of access by a user. In one embodiment, the conductive holder 120 is not enclosed by the housing in a first position, but is moved (e.g., by the horizontal actuator 135) to at least a second position within the housing to perform one or more tests.

Figure 2:
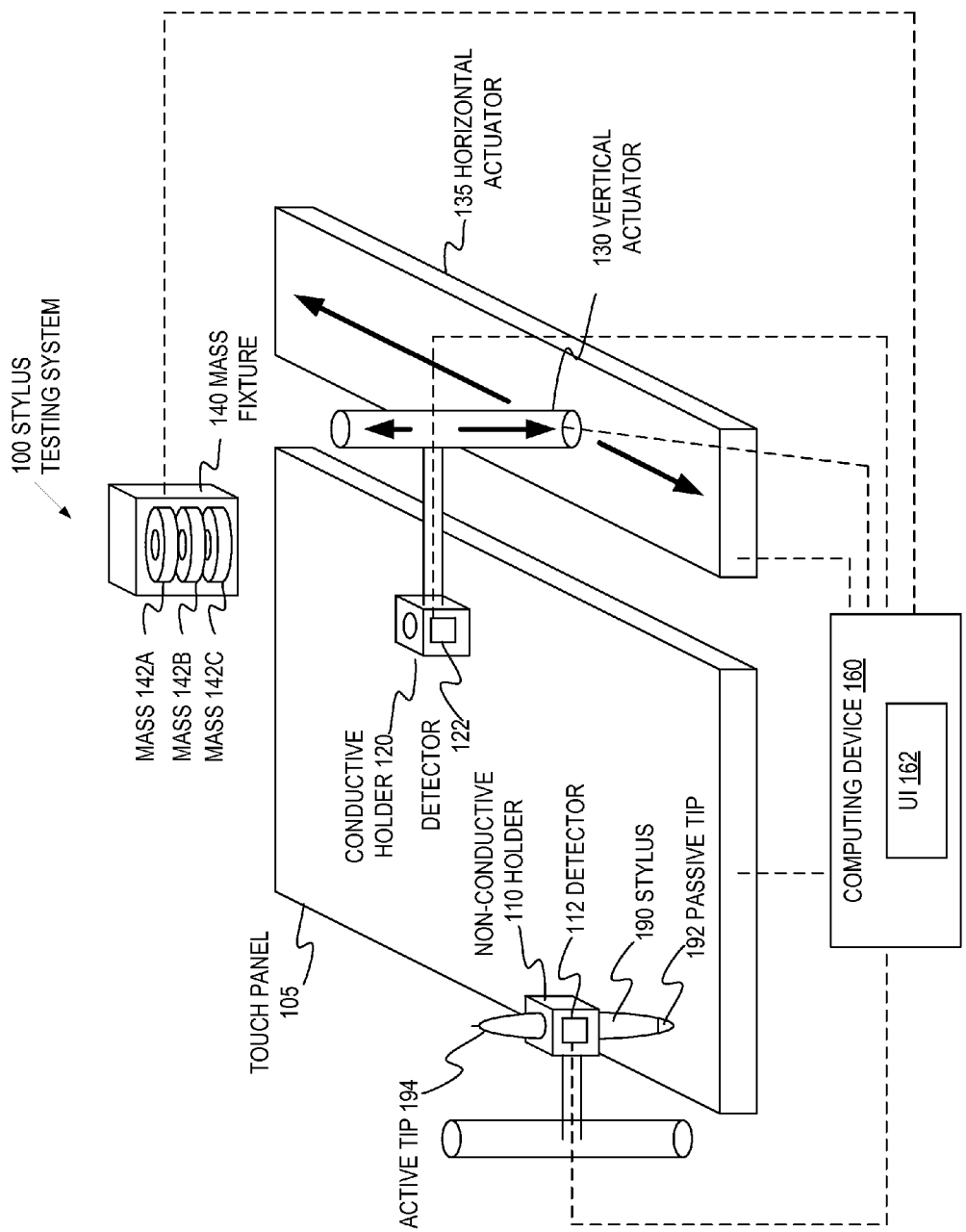
FIG. 2 illustrates the stylus testing system of FIG. 1 with a stylus held by a non-conductive holder in a passive position.

FIG. 2 illustrates the stylus testing system 100 of FIG. 1 with a stylus 190 held by the non-conductive holder 110 in a passive position. The stylus 190 may be an active stylus having a passive tip 192 and an active tip 194. The passive tip 192 of the stylus 190 may be composed of a conductive rubber. The active tip 194 may include a conductive nib attached to a sensor that detects a force or pressure applied to the nib. The active tip 194 may further include electronics that allow the value detected by the sensor to be read by the touch panel 105. For example, the active tip 194 may include a variable capacitor or variable resistor with a value that changes based on the pressure detected by the sensor. The active tip 194 may transmit a signal detectable by the touch panel 105 indicative of the pressure detected by the sensor. The stylus 190 may transmit such a signal while in a wake mode and may not transmit the signal while in a sleep mode. The stylus 190 may be in the wake mode when it is held (e.g., by a user or the conductive holder 120) and in the sleep mode when it is not held. For example, the stylus may detect that it is held based on a capacitance or inductance induced by the user's hand or a conductive holder.

In FIG. 2, the stylus 190 is held by the non-conductive holder 110 in a passive position such that the passive tip 192 is proximal to the touch panel 192 and the active tip (if the stylus 190 includes one) is distal to the touch panel 105. The non-conductive holder 110 may be shaped and/or positioned such that, when a stylus 190 is inserted into non-conductive holder 110 with the passive tip 192 facing towards the touch panel 105, the non-conductive holder 110 holds the stylus 190 vertically with the passive tip 192 in contact with the touch panel.

In this configuration, the stylus testing system 100 may perform a passive touch test in which the passive tip 192 of the stylus 190 is brought into contact with the touch panel 105. In one embodiment, the computing device 160 provides an instruction via the user interface 162 to a user instructing the user to place a stylus to be tested in the non-conductive holder 110 in a passive position. The computing device 160 may receive a signal from the non-conductive holder detector 112 indicating that a stylus 190 is disposed in the non-conductive holder 110. In response to receiving such a signal, the computing device 160 receives passive touch test data from the touch panel 105. The computing device 160 may compare the passive touch test data to expected passive touch test data to determine whether the stylus 190 is functioning properly or is defective. For example, the expected passive touch test data may indicate the presence of the stylus 190 at a particular location (e.g., a location beneath the non-conductive holder 110). If the passive touch test data received from the touch panel 105 does not indicate the presence of the stylus 190 at the particular location (or within a predefined distance of the particular location), it may be determined that the stylus 190 is defective. The stylus 190 may be defective and fail the passive touch test if, for example, a conductive rubber piece of the passive tip 192 is misshaped or not conductive.

If the computing device 160 determines that the stylus 190 has failed the passive touch test, the computing device 160 may produce an output indicating test failure (e.g., a output via the user interface 162 to the user). In one embodiment, the computing device 160 may output that the stylus 190 has failed the passive touch test. In another embodiment, the computing device 160 may output that the stylus 190 is defective. In another embodiment, the computing device 160 may output an instruction to the user to ensure that the stylus 190 is properly inserted (e.g., in a passive position) and run the passive touch test again.

Figure 3:
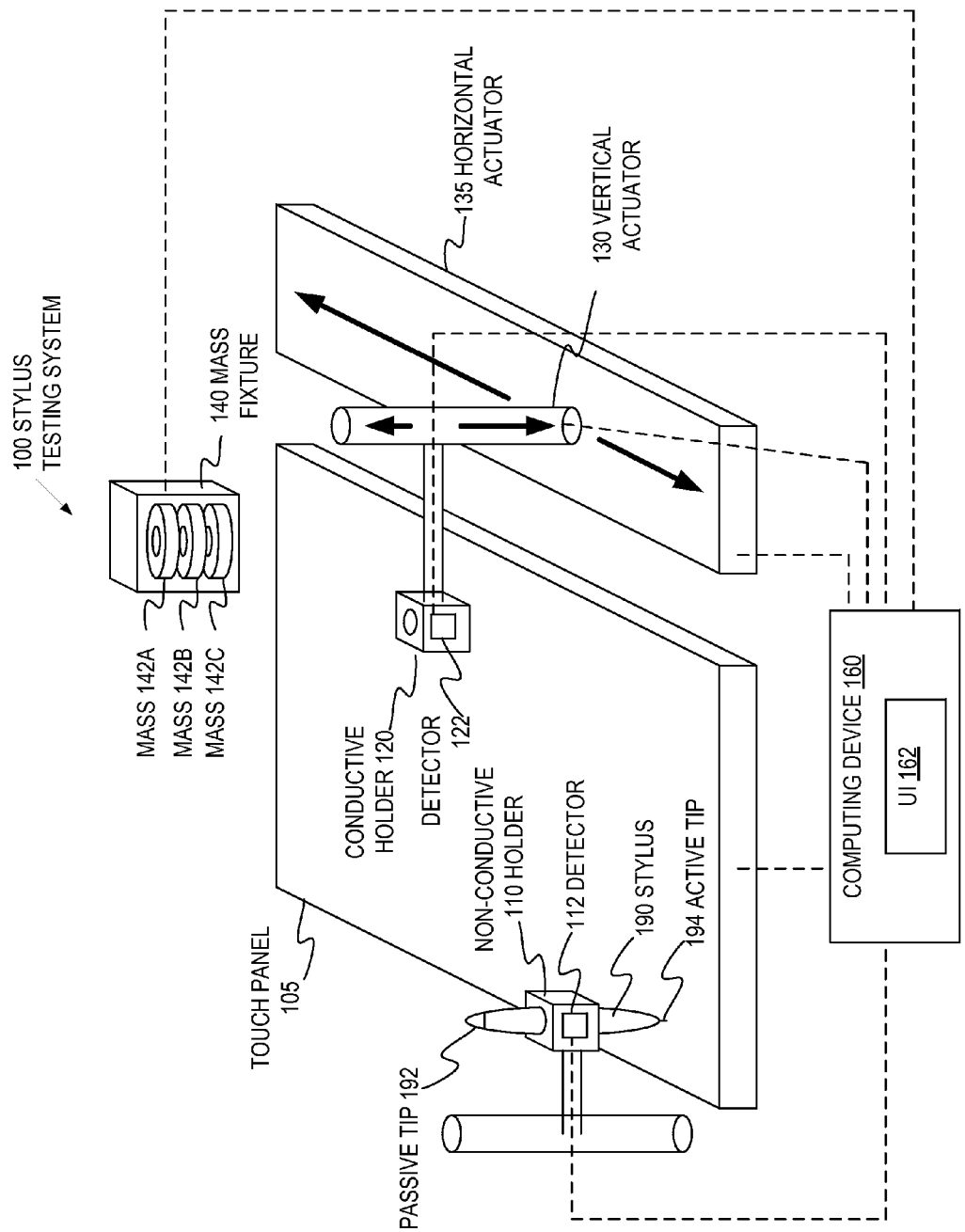
FIG. 3 illustrates the stylus testing system of FIG. 1 with a stylus held by a non-conductive holder in an active position.

FIG. 3 illustrates the stylus testing system 100 of FIG. 1 with a stylus 190 held by the non-conductive holder 110 in an active position. In FIG. 3, the stylus 190 is held by the non-conductive holder 110 in an active position such that the active tip 194 is proximal to the touch panel 105 and the passive tip (if the stylus 190 includes one) is distal to the touch panel 105.

The non-conductive holder 110 may be shaped and/or positioned such that, when a stylus 190 is inserted into non-conductive holder 110 with the active tip 194 facing towards the touch panel 105, the non-conductive holder 110 holds the stylus 190 vertically with the active tip 194 above and not in contact with the touch panel 105.

In this configuration, the stylus testing system 100 may perform a sleep test in which the stylus 190 is placed in a sleep mode. In one embodiment, the computing device 160 provides an instruction via the user interface 162 to a user instructing the user to place a stylus to be tested in the non-conductive holder 110 in an active position. For example, the computing device 160 may provide an instruction to flip the stylus 190 from the passive position to the active position. In another embodiment, the stylus testing system 100 may include motors or actuators to move the stylus 190 from the passive position to the active position.

The computing device 160 may receive a signal from the non-conductive holder detector 112 indicating that a stylus is disposed in the non-conductive holder 110. In response to receiving such a signal, the computing device 160 receives sleep test data from the touch panel 105 including mode data generated by the stylus indicative of a sleep mode or a wake mode of the stylus. The computing device 160 may compare the sleep test data to expected sleep test data to determine whether the stylus 190 is functioning properly or is defective. For example, the expected sleep test data from the touch panel 105 may indicate that no stylus 190 is present or that no stylus 190 is transmitting a signal, e.g., that the stylus 190 is in the sleep mode. If the sleep test data received from the touch panel 105 indicates the presence of the stylus 190, that a signal is received from the stylus 190, or that the stylus 190 is in the wake mode, it may be determined that the stylus 190 is not functioning properly or is defective. The stylus 190 may be defective and fail the sleep test if, for example, a short circuit within the stylus 190 prevents the stylus from being in the sleep mode.

If the computing device 160 determines that the stylus 190 has failed the sleep test, the computing device 160 may produce an output via the user interface 162 to the user. In one embodiment, the computing device 160 may output that the stylus 190 has failed the sleep test. In another embodiment, the computing device 160 may output that the stylus 190 is defective. In another embodiment, the computing device 160 may output an instruction to the user to ensure that the stylus 190 is properly inserted (e.g., in an active position) and is not being touched by the user and run the sleep test again.

Figure 4A:
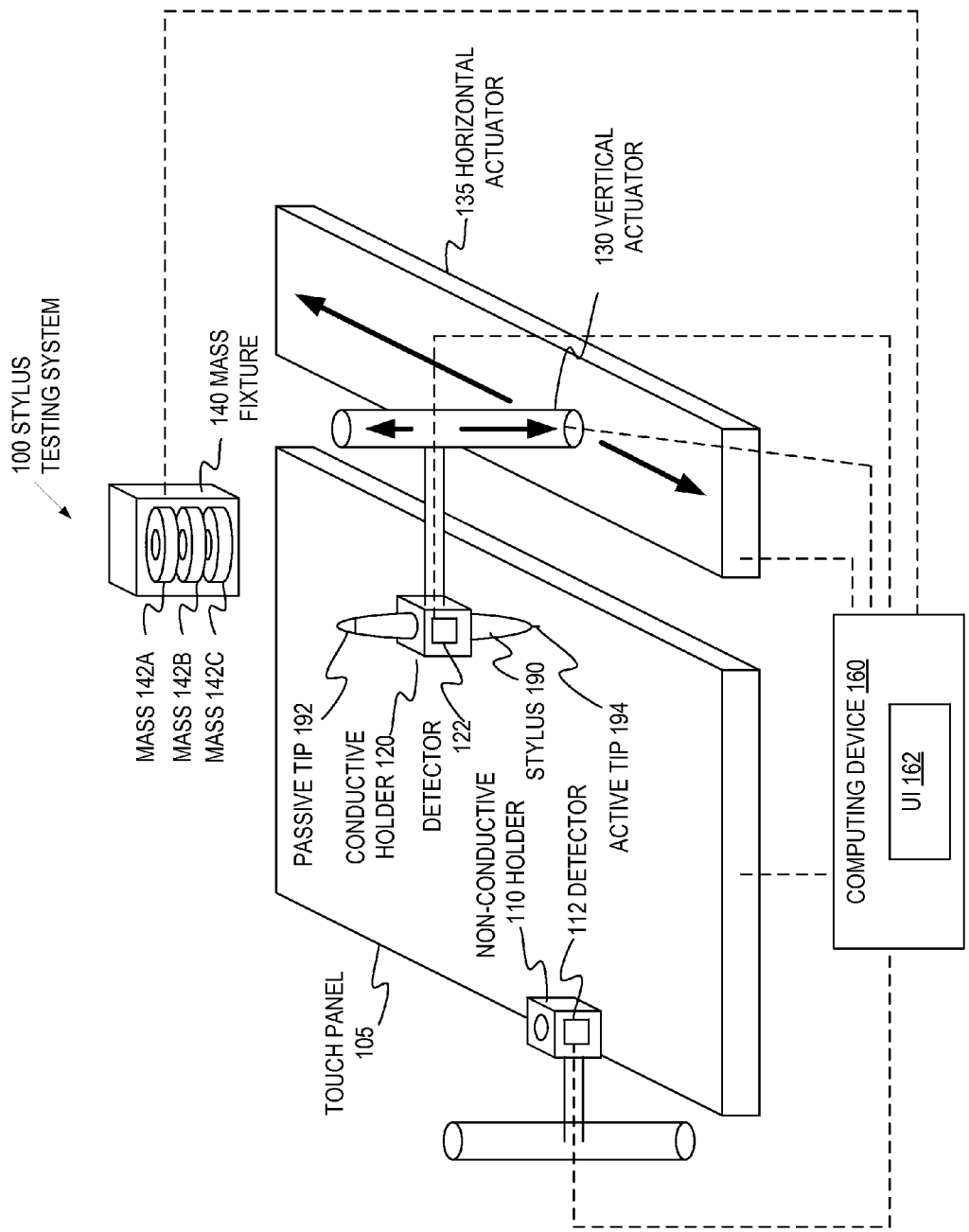
FIG. 4A illustrates the stylus testing system of FIG. 1 with a stylus held by a conductive holder in an active position.

FIG. 4A illustrates the stylus testing system 100 of FIG. 1 with a stylus 190 held by the conductive holder 120 in an active position. In this configuration, the stylus testing system 100 may perform a number of tests of the stylus 190. Two or more of the tests may be performed sequentially without user interaction. The computing device 160 may receive a signal from the conductive holder detector 122 indicating that a stylus 190 is disposed in the conductive holder 120. In response to receiving such a signal, the computing device 160 may initiate one or more of the tests described below.

In one embodiment, the computing device 160 provides an instruction via the user interface 162 to a user instructing the user to place a stylus to be tested in the conductive holder 120 in an active position. In another embodiment, the stylus testing system 100 may include motors or actuators to move the stylus 190 from the non-conductive holder 110 to the conductive holder 120. For example, the holders 110, 120 may be actuatable clamps controlled by the computing device 160. The computing device may send a first signal to the conductive holder 120 to actuate and clamp the stylus 190 and send a second signal to the non-conductive holder 110 to deactivate and release the stylus 190.

The conductive holder 120 may grip the stylus 190 at a position proximal to the active tip 194 so as to place the stylus in a wake mode. The conductive holder 120 may include conductive bristles or conductive foam that contacts a portion of the stylus, proximal to the active tip 192, that detects contact with a conductive object.

In this configuration, the stylus testing system 100 may perform a hover test in which the active tip 194 of the stylus 190 is positioned above, but not in contact with, the touch panel 105. The computing device 160 may send a signal to the vertical actuator 130 to position the stylus 190 such that the active tip 194 is above, and not in contact with, the touch panel 105. The active tip may, for example, be between 10 and 15 millimeters from the touch panel 105. The computing device 160 may also send a signal to the horizontal actuator 135 to position the stylus over a particular location of the touch panel 105. Once the stylus 190 is positioned, the computing device may receive hover test data from the touch panel 105 including mode data generated by the stylus indicative of a sleep mode or a wake mode of the stylus. The computing device 160 may compare the hover test data to expected hover test data to determine whether the stylus is functioning properly or is defective. For example, the expected hover test data may indicate the stylus 190 is in the wake mode (e.g., that a signal is received from the stylus 190). As another example, the expected hover test data may indicate presence of the stylus 190 above (but not in contact) with the touch panel 105 at a particular location of the touch panel 105. The computing device 160 may determine that the stylus 190 is defective if the hover test data received from the touch panel 105 does not indicate that the stylus 190 is in the wake mode, if the hover test data does not indicate that the stylus 190 is present at the particular location (or within a predefined distance of the particular location), if the hover test data indicates that the stylus 190 is touching the touch panel, or for any other mismatch between the hover test data and the expected hover test data. The stylus 190 may be defective and fail the hover test if, for example, the stylus 190 cannot enter the wake mode due to a power source within the stylus 190 being dead.

In the configuration of FIG. 4A, the stylus testing system 100 may also perform an active touch test in which the active tip 194 of the stylus 190 is brought into contact with the touch panel 105. The computing device 160 may send a signal to the vertical actuator 130 to position the stylus 190 such that the active tip 194 is in contact with the touch panel 105. The computing device 160 may also send a signal to the horizontal actuator 135 to position the stylus at a particular location of the touch panel 105. In one embodiment, the active touch test follows the hover test and the stylus is already located at the particular location such that no signal is sent to the horizontal actuator 135. Once the stylus 190 is positioned, the computing device 160 may receive active touch test data from the touch panel 105. The computing device 160 may compare the active touch test data to expected active touch test data to determine whether the stylus is functioning properly or is defective. For example, the expected active touch test data may indicate the stylus 190 is in the wake mode (e.g., that a signal is received from the stylus 190). As another example, the expected active touch test data may indicate presence of the stylus 190 in contact with the touch panel 105 at a particular location of the touch panel 105. The computing device 160 may determine that the stylus 190 is defective if the active touch test data received from the touch panel 105 does not indicate that the stylus 190 is in the wake mode, if the active touch test data does not indicate that the stylus 190 is in contact with the touch panel 105 at the particular location (or within a predefined distance of the particular location), or for any other mismatch between the active touch test data and the expected active touch test data. The stylus 190 may be defective and fail the active touch test if, for example, the stylus 190 cannot enter the wake mode.

In the configuration of FIG. 4A, the stylus testing system 100 may also perform a path test in which the stylus 190 is moved across the touch panel 105 along a path with the active tip 194 in contact with the touch panel 105. In one embodiment, the path may be a straight line. The computing device 160 may send a signal to the vertical actuator 130 to position the stylus 190 such that the active tip 194 is in contact with the touch panel 105. In one embodiment, the path test follows the active touch test (or another test in which the active tip 194 is in contact with the touch panel 105) and no signal is sent to the vertical actuator 130. Once the stylus is in contact with the touch panel 105 at a first location, the computing device 160 may send a signal to the horizontal actuator 135 to move the stylus 190 across the touch panel 105 along a path to a second location. The path may be, for example, a line. In one embodiment, the line is at approximately 45 degrees to rows and columns of elements of the touch panel 105. In embodiments in which the horizontal actuator 135 can move the conductive holder 120 and stylus 190 in more than one direction, the path may include multiple line segments and/or one or more curved segments. For example, the path may be a circle beginning and ending at the first location. Thus, the second location where the path ends may be the same as the first location at which the path begins.

While the horizontal actuator 135 moves the stylus along the path, the computing device 160 receives path test data from the touch panel 105. The computing device 160 may compare the path test data to expected path test data to determine whether the stylus 190 is functioning properly or is defective. For example, the expected path test data may indicate the stylus 190 has moved along a particular path or in a straight line. The computing device 160 may determine that the stylus 190 is defective if the path test data received from the touch panel 105 does not indicate that the stylus 190 has moved along the path. In a particular embodiment, the computing device 160 may determine that the stylus 190 is defective if the path test data received from the touch panel 105 does not indicate that the stylus has moved in a straight line. The stylus 190 may be defective and fail the path test if, for example, the active tip 194 is misshaped, resulting in a non-uniform contact with the touch panel 105 during motion.

Figure 4B:
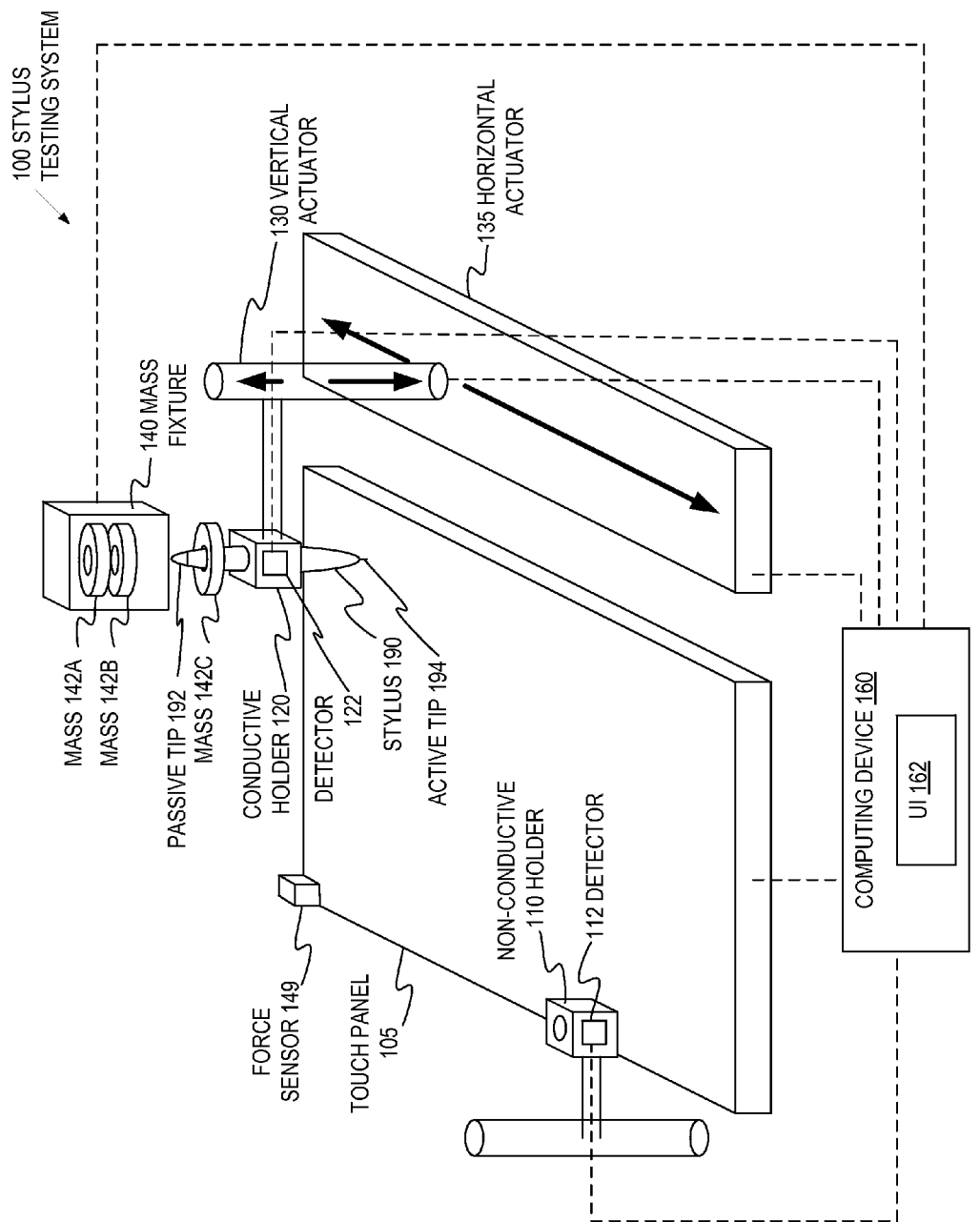
FIG. 4B illustrates the stylus testing system of FIG. 1 with a mass applied to the stylus.

With the stylus 190 disposed in the conductive holder 120 in active position, the stylus testing system 100 may also perform a mass test in which one or more masses are placed upon the stylus 190 while the active tip 194 of the stylus 190 is in contact with the touch panel 105. FIG. 4B illustrates the stylus testing system of FIG. 1 with a mass applied to the stylus.

The computing device 160 may send a signal to the vertical actuator 130 to position the stylus 190 such that the active tip 194 is in contact with the touch panel 105. In one embodiment, the mass test follows the path test (or another test in which the active tip 194 is in contact with the touch panel 105) and no signal is sent to the vertical actuator 130. Once the stylus 190 is in contact with the touch panel 105, the computing device 160 may send a signal to the horizontal actuator 135 to move the stylus 190 to a location beneath the mass fixture 140. In one embodiment, the path test ends beneath the mass fixture 140 and no signal is sent to the horizontal actuator 135.

Once the stylus 190 is beneath the mass fixture 140, the computing device 160 may send a signal to the mass fixture 140 to place one or more masses 142A-142C onto the stylus 190. Each of the masses 142A-142C may be attachable to at least one of the conductive holder 120 or the stylus 190. In one embodiment, each mass 142A-142C may be generally cylindrically shaped with a hole in the middle through which the stylus 190 passes when the masses 142A-142C are placed upon the stylus 190. The stylus 190 may be generally ellipsoidal such that the masses 142A-142C rest, as shown in FIG. 4B, on the body of the stylus 190 rather than on the passive tip 192.

When the one or more masses 142A-142C are loaded onto the stylus 190, the computing device 160 receives mass test data from the touch panel 105. The computing device 160 may compare the mass test data to expected mass test data to determine whether the stylus 190 is functioning properly or is defective. For example, the expected mass test data may include pressure data generated by the stylus indicative of a pressure or force of a particular strength is applied at a location beneath the mass fixture 140. The computing device 160 may determine that the stylus 190 is defective if the mass test data received from the touch panel 105 does not indicate that the stylus 190 is applying a pressure or force of the particular strength (or a pressure or force within a predefined range of the particular strength) at the particular location (or within a predefined distance of the particular location). The stylus 190 may be defective and fail the mass test if, for example, the active tip 194 is unable to send different signals for different forces.

In one embodiment, the mass test involves the separate application of two or more masses. Once the stylus 190 is beneath the mass fixture 140, the computing device 160 may send a first signal to the mass fixture 140 to place a first mass 142C onto the stylus. Once the first mass 142C is loaded onto the stylus (as illustrated in FIG. 4B), the computing device 160 may receive first mass test data from the touch panel 105 including first pressure data (generated by the stylus 190) indicative of a first pressure applied by the stylus 190 to the touch panel 105 with the first mass on the stylus 190. Then, the computing device 160 may send a second signal to the mass fixture 140 to place a second mass 142B onto the stylus (with or without removal of the first mass 142C). Once the second mass 142B is loaded onto the stylus, the computing device 160 may receive second mass test data from the touch panel 105 including second pressure data (generated by the stylus 190) indicative of a second pressure applied by the stylus to the touch panel 105 with at least the second mass 142B on the stylus 190. It is to be appreciated that the mass of the masses 142A-142C may be the same or different. In one embodiment, the first mass 142C is approximately 100 grams and the second mass 142B is approximately 300 grams. In another embodiment, four masses of 100 grams, 100 grams, 500 grams, and 400 grams, respectively, are used. The computing device 160 may compare the mass test data (including the first mass test data and the second mass test data) to expected mass test data to determine whether the first pressure and the second pressure are within threshold amounts of an expected first pressure and expected second pressure and, thus, whether the stylus 190 is functioning properly or is defective. The stylus 190 may be defective and fail the mass test if, for example, the active tip 194 is unable to send different signals for different pressures.

Whereas the mass test may be used to determine whether the stylus 190 is appropriately generating data indicative of a pressure applied by the stylus 190 to the touch panel 105 by applying a force from above the touch panel, the stylus may be similarly tested using a force applied from below the touch panel 105. Thus, in one embodiment, when the stylus 190 is disposed in the conductive holder 120 and in contact with the touch panel 105, a force is applied from below the touch panel 105 to generate a pressure at the point of contact between the stylus 190 and the touch panel 105. The amount of force applied may be detected using a force sensor 149 in contact with the touch panel 105. The force sensor 149 may be, for example, another stylus. The force sensor 149 may be any other device for measuring the amount of force applied.

The data generated by the stylus 190 (and received from the touch panel) indicative of the pressure applied to the touch panel 105 by the stylus 190 may be compared to the data from the force sensor 149 (as expected test data) received by the computing device 160 to determine whether the stylus 190 is functioning properly. In one embodiment, the computing device 160 may adjust the amount of force applied from below the touch panel 105 based on data received from the force sensor 149. For example, the computing device 160 may increase the amount of force applied from below the touch panel 105 until the data received from the force sensor 149 indicated that the desired amount of force is being applied.

Figure 5:
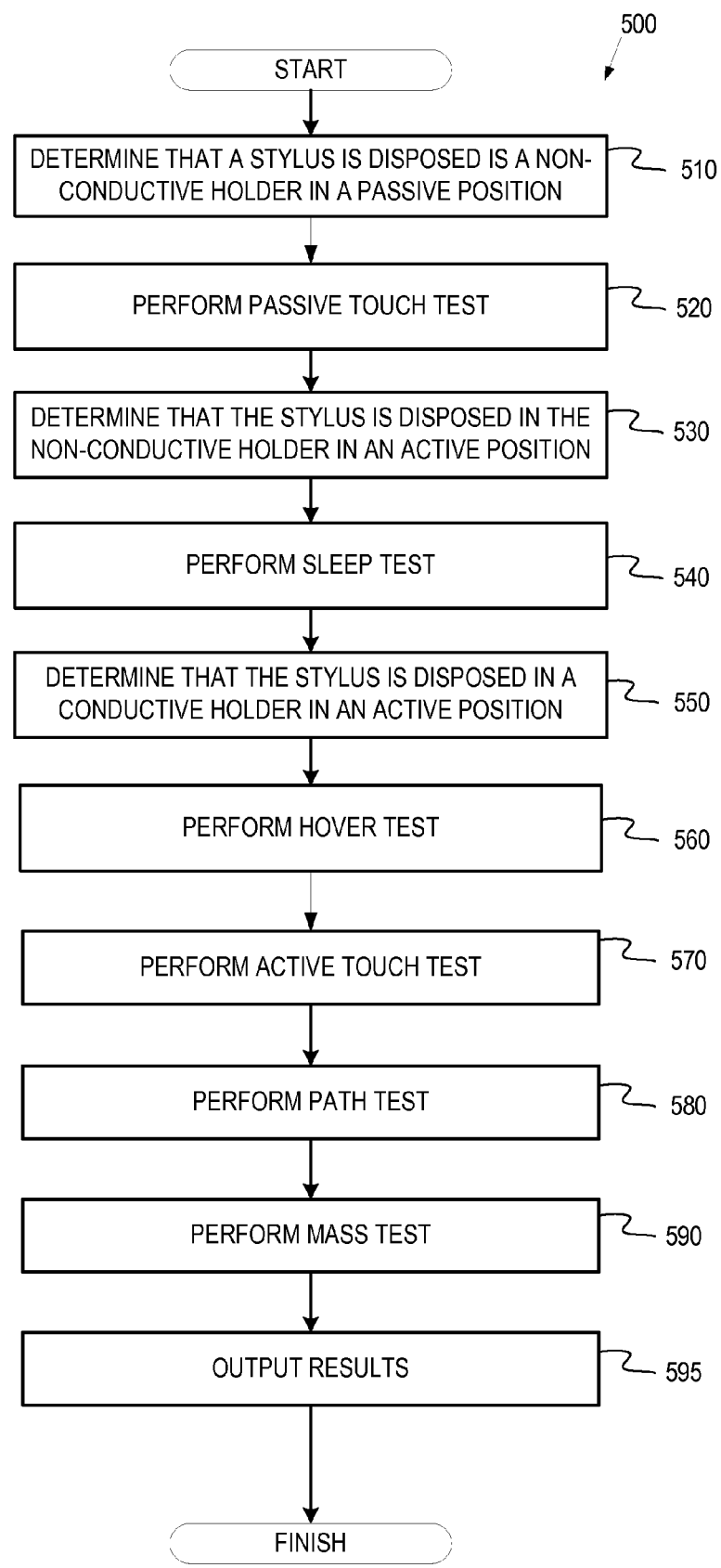
FIG. 5 illustrates a flowchart of an embodiment for a method of testing a stylus.

FIG. 5 illustrates a flowchart of an embodiment for a method 500 of testing a stylus. The method 500 may be performed by processing logic that may include hardware (e.g., circuitry, dedicated logic, programmable logic, microcode, etc.), software (e.g., instructions executed by a processing device), firmware or a combination thereof. For example, the method 500 may be performed by the computing device 160 of FIG. 1 (or a processing device thereof). Method 500 may additionally be performed by a stylus testing system, such as stylus testing system 100 of FIG. 1. It is to be appreciated that the method 500 may be performed for any number of styluses consecutively or concurrently. However, for ease of reference, the method 500 is described for a single stylus in FIG. 5. It is to be further appreciated that the method 500 may perform the steps in a different order than described below, exclude some of the steps described below, may include additional steps (e.g., additional tests or repetition of tests), or any combination thereof.

At block 510, the processing logic determines that a stylus is disposed in a non-conductive holder in a passive position. The processing logic may determine that the stylus is disposed in the non-conductive holder based on a signal from a detector indicating that the stylus is disposed in the non-conductive holder. The processing logic may determine that the stylus is disposed in the non-conductive holder based on input from a user given in response to instructions to place the stylus in the non-conductive holder. For example, the processing logic may output an instruction to a user via a user interface to place the stylus in the non-conductive holder and await an input from the user (e.g., clicking a "start" button). The processing logic may determine that the stylus is disposed in the non-conductive holder based on automatically moving the stylus into the non-conductive holder (e.g., from a conductive holder or a pre-test loading bin). The processing logic may determine that the stylus is disposed in the non-conductive holder using any combination of the above methods or any other method.

At block 520, the processing logic performs a passive touch test of the stylus. The passive touch test may be performed automatically by the processing logic without user input or interaction. In response to determining that the stylus is in the non-conductive holder in a passive position, the processing logic receives passive touch test data from a touch panel. The processing logic determines whether the stylus has passed the passive touch test based on the passive touch test data. The processing logic may determine whether the stylus has passed the passive touch test by comparing the passive touch test data to expected passive touch test data. The processing logic may determine that the stylus has passed the passive touch test if the passive touch test data from the touch panel indicates that the stylus is present at a particular location on the touch panel or within a predefined distance of the particular location.

At block 530, the processing logic determines that the stylus is disposed in the non-conductive holder in an active position. The processing logic may determine that the stylus is disposed in the non-conductive holder based on a signal from a detector indicating that the stylus is disposed in the non-conductive holder. The processing logic may determine that the stylus is disposed in the non-conductive holder based on input from a user given in response to instructions to place the stylus in the non-conductive holder in an active position. For example, the processing logic may output an instruction to a user via a user interface to place the stylus in the non-conductive holder in the active position and await an input from the user (e.g., clicking a "start" button). The processing logic may determine that the stylus is disposed in the non-conductive holder based on automatically moving the stylus into the non-conductive holder (e.g., from a conductive holder or a pre-test loading bin). The processing logic may determine that the stylus is disposed in the non-conductive holder in an active position using any combination of the above methods or any other method.

At block 540, the processing logic performs a sleep test of the stylus. The sleep test may be performed automatically by the processing logic without user input or interaction. In response to determining that the stylus is in the non-conductive holder in an active position, the processing logic receives sleep test data from the touch panel. The processing logic determines whether the stylus has passed the sleep test based on the sleep test data. The processing logic may determine whether the stylus has passed the sleep test by comparing the sleep test data to expected sleep test data. The processing logic may determine that the stylus has passed the sleep test if the sleep test data from the touch panel indicates that no stylus is present on the touch panel or that no signal is received from the stylus.

At block 550, the processing logic determines that the stylus is disposed in a conductive holder in an active position. The processing logic may determine that the stylus is disposed in the conductive holder based on a signal from a detector indicating that the stylus is disposed in the conductive holder. The processing logic may determine that the stylus is disposed in the conductive holder based on input from a user given in response to instructions to place the stylus in the conductive holder in an active position. For example, the processing logic may output an instruction to a user via a user interface to place the stylus in the conductive holder in the active position and await an input from the user (e.g., clicking a "start" button). The processing logic may determine that the stylus is disposed in the conductive holder based on automatically moving the stylus into the conductive holder (e.g., from the non-conductive holder or a pre-test loading bin). The processing logic may determine that the stylus is disposed in the conductive holder in an active position using any combination of the above methods or any other method.

At block 560, the processing logic performs a hover test of the stylus. The hover test may be performed automatically by the processing logic without user input or interaction. In response to determining that the stylus is in the conductive holder in an active position, the processing logic sends a signal to one or more actuators to position the stylus in a hover position above and not in contact with the touch panel. In the hover position, the stylus (e.g., an active tip of the stylus) may be less than 10 millimeters from the touch panel or between 10 and 15 millimeters from the touch panel. Once the stylus is in the hover position, the processing logic receives hover test data from the touch panel. The processing logic determines whether the stylus has passed the hover test based on the hover test data. The processing logic may determine whether the stylus has passed the hover test by comparing the hover test data to expected hover test data. The processing logic may determine that the stylus has passed the hover test if the hover test data from the touch panel indicates that no stylus is in contact with the touch panel, but that a signal is received from the stylus. The processing logic may determine that the stylus has passed the hover test if the hover test data from the touch panel indicates that a stylus is above a particular location (or a location within a predefined distance of the particular location) of the touch panel and a signal is received from the stylus.

At block 570, the processing logic performs an active touch test of the stylus. The active touch test may be performed automatically by the processing logic without user input or interaction. The processing logic sends a signal to one or more actuators to position the stylus in an active touch position in contact with the touch panel. In the active touch position, the stylus (e.g., an active tip of the stylus) may be in contact with the touch panel. Once the stylus is in the active touch position, the processing logic receives active touch test data from the touch panel. The processing logic determines whether the stylus has passed the active touch test based on the active touch test data. The processing logic may determine whether the stylus has passed the active touch test by comparing the active touch test data to expected active touch test data. The processing logic may determine that the stylus has passed the active touch test if the active touch test data from the touch panel indicates that a stylus is in contact with the touch panel at a particular location (or a location within a predefined distance of the particular location) of the touch panel and a signal is received from the stylus.

At block 580, the processing logic performs a path test of the stylus. The path test may be performed automatically by the processing logic without user input or interaction. The processing logic sends a signal to one or more actuators to position the stylus in a first position in contact with the touch panel at a first location. The processing logic sends a signal to the one or more actuators to move the stylus along a path from the first position to a second position in contact with the touch panel at a second location. In one embodiment, the path is a straight line. In another embodiment, the path is a circle. Thus, the second location may be the same as the first location. While the stylus is moving from the first position to the second position, the processing logic receives path test data from the touch panel. The processing logic determines whether the stylus has passed the path test based on the path test data. The processing logic may determine whether the stylus has passed the path test by comparing the path test data to expected path test data. The processing logic may determine that the stylus has passed the path test if the path test data from the touch panel indicates that that stylus is in contact with the touch panel at a series of locations that matches an expected series of locations. The processing logic may determine that the stylus has passed the pass test if the path test data from the touch panel indicates that the stylus is in contact with the touch panel at a series of locations that satisfy a linearity metric. For example, the stylus may pass the path test if each of the series of locations is within a predefined distance of a line, if the sum of the distances of the locations from a line is greater than a threshold, or if the series of locations have a standard deviation from a line of less than a threshold.

At block 590, the processing logic performs a mass test of the stylus. The mass test may be performed automatically by the processing logic without user input or interaction. The processing logic sends a signal to one or more actuators to position the stylus in a third position in contact with the touch panel at a mass test location beneath a mass fixture. The third position may be the same as the first position or the second position of the path test of block 580. The processing logic sends a signal to a mass fixture to place one or more masses onto the stylus. When the one or more masses are positioned on the stylus, the processing logic receives mass test data from the touch panel. The processing logic determines whether the stylus has passed the mass test based on the mass test data. The processing logic may determine whether the stylus has passed the mass test by comparing the mass test data to expected mass test data. The processing logic may determine that the stylus has passed the mass test if the mass test data from the touch panel indicates that that stylus is in contact with the touch panel at the mass test location applying a particular pressure or force to the touch panel. The processing logic may determine that the stylus has passed the mass test if the mass test data from the touch panel indicates that the stylus has applied a series of pressures or forces (associated with a series of masses) that satisfy a linearity metric. For example, the stylus may pass the mass test if when twice the mass is loaded onto the stylus, the mass test data indicates that twice the pressure or force is applied to the touch panel at the mass test location.

At block 595, the processing logic outputs results of the testing. The processing logic may output an indication of whether the stylus is functioning properly or is defective. The processing logic may output an indication of which tests were passed and which were failed. The results of the testing, including the data received from the touch panel may be output to a storage for further processing at a later time.

Following block 595, the method 500 may return to block 510 to repeat the method 500 for the same stylus or a different stylus. The method 500 may return to and repeat particular blocks of the method. For example, if the stylus has failed a particular test, the method 500 may return to the block of that test and repeat the test.

Figure 6A:
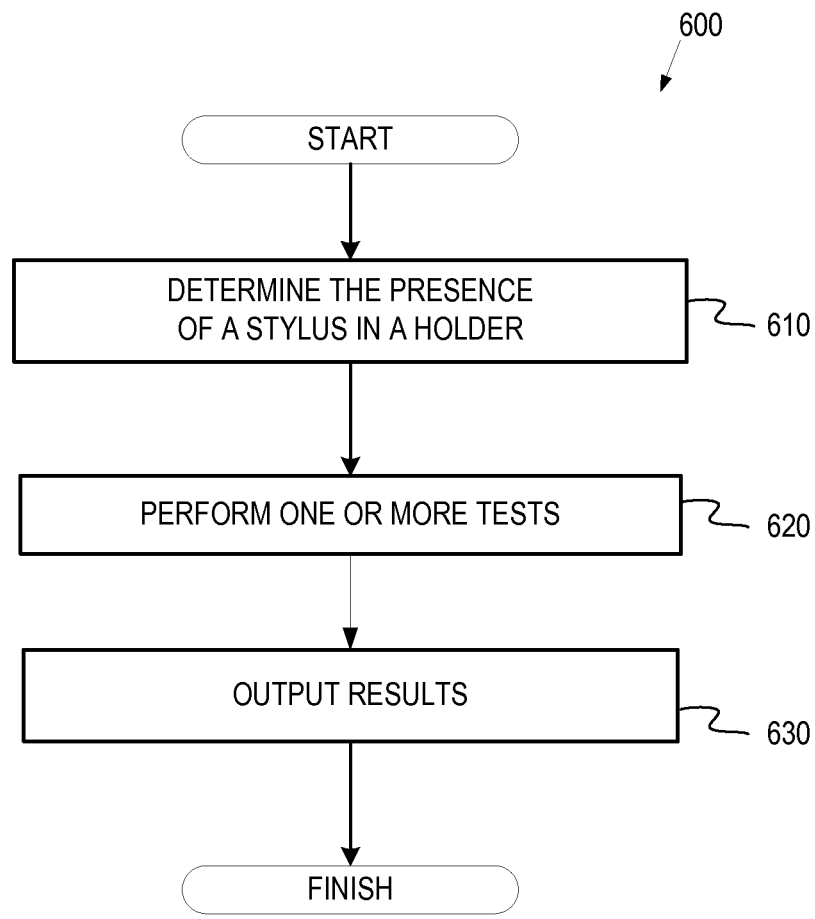
FIG. 6A illustrates a flowchart of another embodiment for a method of testing a stylus.

FIG. 6A illustrates a flowchart of another embodiment of a method 600 of testing a stylus. The method 600 may be performed by processing logic that may include hardware (e.g., circuitry, dedicated logic, programmable logic, microcode, etc.), software (e.g., instructions executed by a processing device), firmware or a combination thereof. For example, the method 600 may be performed by the computing device 160 of FIG. 1 (or a processing device thereof). Method 600 may additionally be performed by a stylus testing system, such as stylus testing system 100 of FIG. 1. It is to be appreciated that the method 600 may be performed for any number of styluses consecutively or concurrently. However, for ease of reference, the method 600 is described for a single stylus in FIG. 6A.

At block 610, the processing logic determines the presence of a stylus in a holder. The processing logic may determine that the stylus is disposed in a non-conductive holder or a conductive holder. The processing logic may determine that the stylus is disposed in an active position or a passive position. The processing logic may determine that the stylus is in contact with a touch panel or above the touch panel and not in contact with the touch panel.

The processing logic may determine that the stylus is present in a holder based on a detector signal from a detector indicating that the stylus is disposed in the holder. The processing logic may determine that the stylus is present in the holder based on input from a user given in response to instructions to place the stylus in the holder. For example, the processing logic may output an instruction to a user via a user interface to place the stylus in the holder and await an input from the user (e.g., clicking a "start" button). The processing logic may determine that the stylus is present in the based on automatically moving the stylus into the holder using one or more actuators or motors. The processing logic may determine that the stylus is present in the holder using any combination of the above methods or any other method.

At block 620, the processing logic performs one or more tests of the stylus. In response to determining that the stylus is present in a non-conductive holder in a passive position, the processing logic may perform a passive touch test of the stylus. In response to determining that the stylus is present in a non-conductive holder in an active position, the processing logic may perform a sleep test of the stylus. In response to determining that the stylus is present in a conductive holder in an active position, the processing logic may perform at least one of a hover test, an active touch test, a path test, or a mass test. In response to determining that the stylus is present in a conductive holder in a passive position, the processing logic may perform at least one of a passive touch test or a path test. The processing logic may perform other tests of the stylus in various positions.

The one or more tests may be performed automatically by the processing logic without user input or interaction. In particular, the processing logic may sequentially perform two or more tests without user input or interaction between the two or more tests. As an example, the processing logic may perform a path test and a mass test without user input or interaction between the two tests.

The processing logic may perform the one or more tests based on input from a user (e.g., via a user interface). In one embodiment, the processing logic performs the one or more tests based on input from user indicating which tests are to be performed. For example, the processing logic may provide a selection interface that allows a user to indicate (e.g., via a set of checkboxes) which tests to perform. The processing logic may perform the one or more tests based on a script received from the user indicating at least one test which is to be performed, an action to be taken if a test is failed (e.g., retry the test), a delay to be taken between tests (e.g., wait a particular amount of time or wait for a user input to continue), or any other instruction. In one embodiment, the processing logic performs the one or more tests based on input from a user indicating criteria for passing or failing the test.

Performing the one or more tests may include sending actuator signals to one or more actuators. The processing logic may send a signal to a vertical actuator to lower the stylus into contact with the touch panel. The processing logic may send a signal to the vertical actuator to raise or lower the stylus into a hover position. The processing logic may send a signal to a horizontal actuator to move the stylus along a path. In particular, the processing local may send a signal to horizontal actuator to move the stylus along a straight line. The processing logic may send a mass fixture signal to an actuator of a mass fixture to place one or more masses onto the stylus (or remove the masses from the stylus).

Performing the one or more tests may include receiving data from the touch panel. The data received from the touch panel may indicate the presence of the stylus at a particular location of the touch panel. The data received from the touch panel may indicate that the stylus is in contact with the touch panel at a particular location or is hovering above the touch panel at a particular location. The data received from the touch panel may indicate that the stylus is applying a particular pressure or force to the touch panel at a particular location.

Performing the one or more tests may include determining whether or not the stylus has passed or failed the test. Thus, performing the one or more tests may include determining whether the stylus is functioning properly or is defective.

Performing the one or more tests may include comparing the data from the touch panel to expected data for the one or more tests. The expected data may be in the same form as the received data (e.g., indicating that the stylus is at a particular location of the touch panel or applying a particular force at the particular location) or in a different form. Performing the one or more tests may include generating a linearity metric for the data. For example, a path test may be passed if a linearity metric of the location data from the touch panel is above a threshold. As another example, a mass test may be passed if a linearity metric of the force data from the touch panel is above a threshold.

At block 630, the processing logic outputs results of the tests. The processing logic may output the results of the test over a user interface. The processing logic may output an indication of whether the stylus is functioning properly or is defective. The processing logic may output an indication of which tests were passed and which were failed.

Figure 6B:
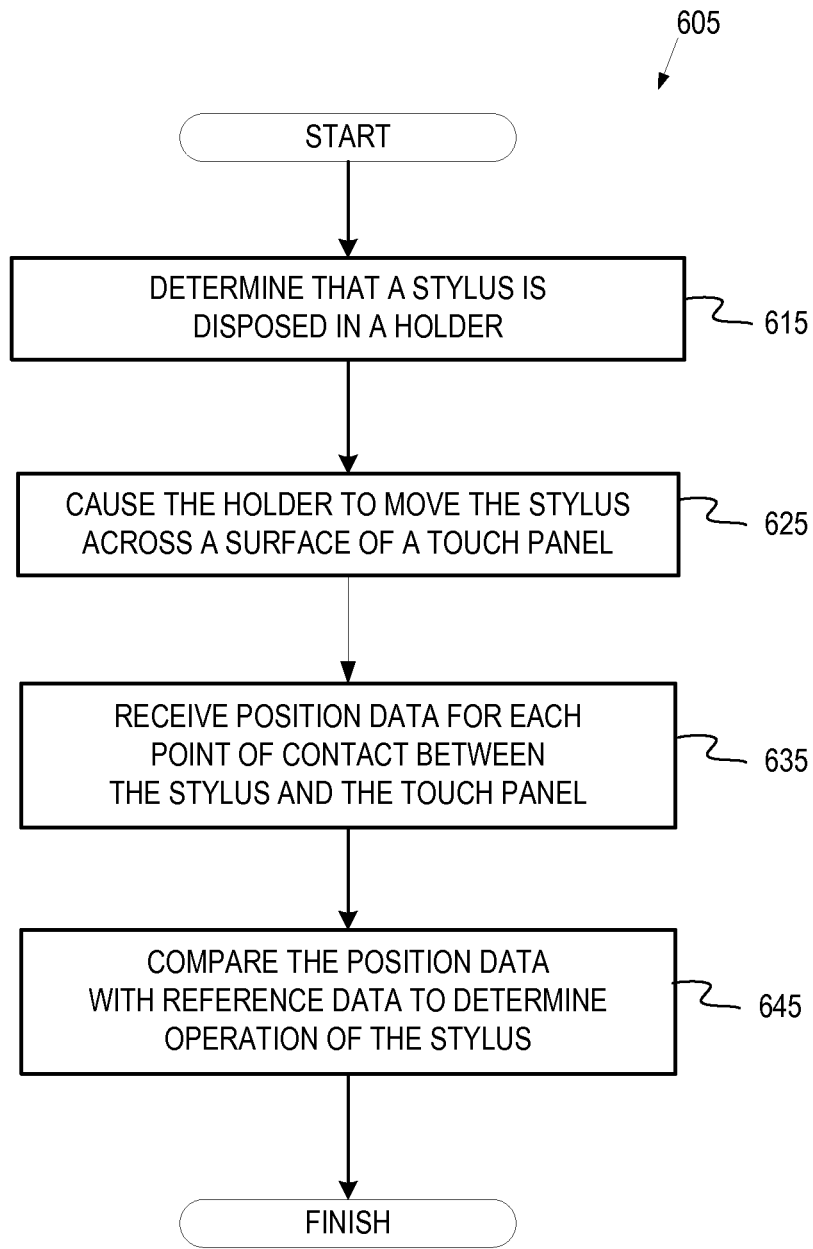
FIG. 6B illustrates a flowchart of an embodiment for a method of performing a path test of a stylus.

FIG. 6B illustrates a flowchart of an embodiment for a method 615 of performing a path test of a stylus. The method 615 may be performed by processing logic that may include hardware (e.g., circuitry, dedicated logic, programmable logic, microcode, etc.), software (e.g., instructions executed by a processing device), firmware or a combination thereof. For example, the method 615 may be performed by the computing device 160 of FIG. 1 (or a processing device thereof). Method 615 may additionally be performed by a stylus testing system, such as stylus testing system 100 of FIG. 1. It is to be appreciated that the method 615 may be performed for any number of styluses consecutively or concurrently. However, for ease of reference, the method 600 is described for a single stylus in FIG. 6B.

At block 615, the processing logic determines that a stylus is disposed in a holder. The processing logic may determine that the stylus is disposed in a non-conductive holder or a conductive holder. The processing logic may determine that the stylus is disposed in an active position or a passive position. The processing logic may determine that the stylus is in contact with a touch panel or above the touch panel and not in contact with the touch panel.

The processing logic may determine that the stylus is disposed in a holder based on a detector signal from a detector indicating that the stylus is disposed in the holder. The processing logic may determine that the stylus is disposed in the holder based on input from a user given in response to instructions to place the stylus in the holder. For example, the processing logic may output an instruction to a user via a user interface to place the stylus in the holder and await an input from the user (e.g., clicking a "start" button). The processing logic may determine that the stylus is disposed in the holder based on automatically moving the stylus into the holder using one or more actuators or motors. The processing logic may determine that the stylus is disposed in the holder using any combination of the above methods or any other method.

The stylus may be positioned above a touch panel that generates position data for each point of contact between the stylus and the touch panel. The position data may indicate the location of the stylus with respect to the touch panel for each point of contact between the stylus and the touch panel. The position data may, for example, be indicative of the presence of a stylus in contact with a particular location of the touch panel.

At block 625, the processing logic causes the holder to move the stylus across a surface of the touch panel along a path. The processing logic may cause the holder to move the stylus by sending a signal to an actuator to move the holder with the stylus disposed in the holder. The processing logic may move the stylus along the path from a first location on the touch panel to a second location on the touch panel. In one embodiment, an active tip of the touch panel is in contact with the touch panel at a first point, a second point, and a third point along the path. In another embodiment, a passive tip of the stylus is in contact with the touch panel at a first point, a second point, and a third point along the path.

At block 635, the processing logic receives position data for each point of contact between the stylus and the touch panel as the holder moves the stylus across the surface of the touch panel along the path. For example, the processing logic may receive, from the touch panel, first position data corresponding to a first point, second position data corresponding to a second point, and third position data corresponding to a third point.

At block 645, the processing logic compares the position data with reference data to determine operation of the stylus. For example, the processing logic may compare the position data with reference data defining the path in order to determine whether the stylus is functioning properly or is defective. For example, the processing logic may determine that the first, the second, and the third position data matches reference data for the first, the second, and the third points, respectively. The processing logic may determine that the first, the second, and the third points lie along a straight line.

As described above with respect to the active touch test and mass test, the processing logic may also receive, from the touch panel, pressure data generated by the stylus and compare the pressure data with reference pressure data to determine operation of the stylus. For example, the processing logic may send a first signal to an actuator to move the stylus beneath a mass fixture and send a second signal to the mass fixture to place one or more masses onto the stylus. The processing logic may receive pressure data, from the touch panel, generated by the stylus indicative of a pressure applied by the stylus to the touch panel with the one or more masses on the stylus. The processing logic may compare the pressure data to reference pressure data to determine operation of the stylus.

The processing logic, as described above with respect to FIG. 5, performs additional tests of the stylus. For example, as described with respect to block 520, the processing logic may perform a passive touch test of the stylus. Thus, as described in detail above, the processing logic may determine that the stylus is disposed in a non-conductive holder with a passive tip of the stylus in contact with the touch panel and receive first position data for a first point of contact between the passive tip and touch panel. The processing logic may compare the first position data with reference position data for the first point to determine operation of the stylus.

The processing logic may perform a test to determine if the stylus is appropriately in a sleep mode or a wake mode. For example, the processing logic may determine that the stylus is disposed in a non-conductive holder and determine that the stylus is not in a wake mode and, thus, functioning properly. As another example, the processing logic may determine that the stylus is disposed in a conductive holder and determine that the stylus is in a wake mode and, thus, functioning properly.

Figure 7:
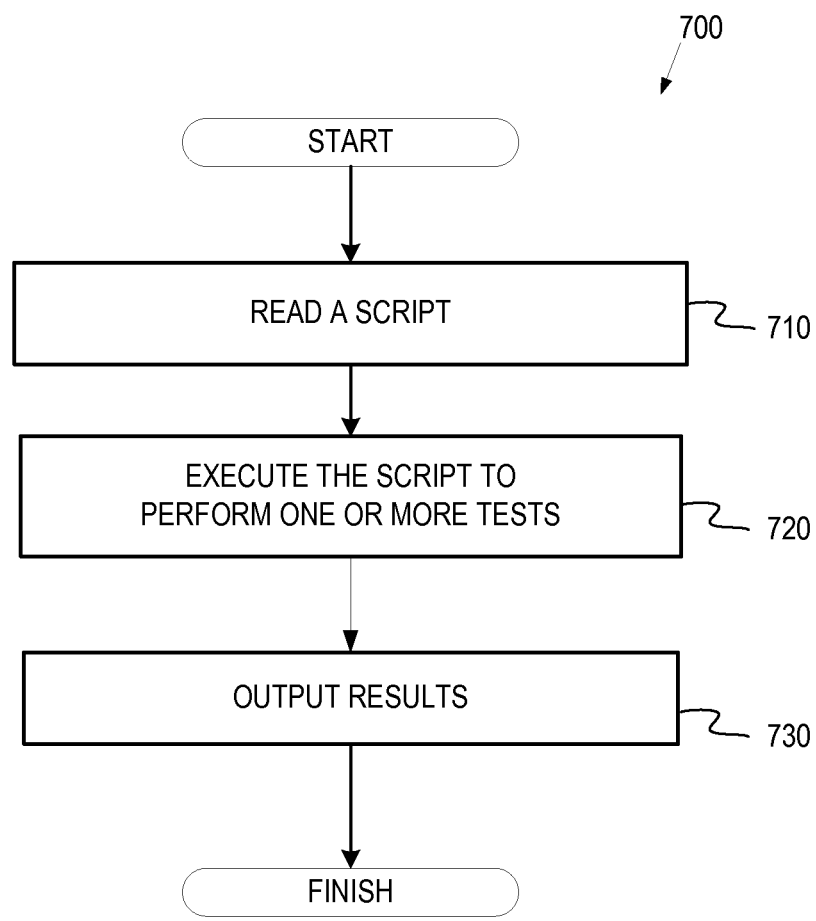
FIG. 7 illustrates a flowchart of an embodiment for a method of testing a stylus by executing a script.

FIG. 7 illustrates a flowchart of an embodiment of a method 700 of testing a stylus by executing a script. The method 700 may be performed by processing logic that may include hardware (e.g., circuitry, dedicated logic, programmable logic, microcode, etc.), software (e.g., instructions executed by a processing device), firmware or a combination thereof. For example, the method 700 may be performed by the computing device 160 of FIG. 1 (or a processing device thereof). Method 700 may additionally be performed by a stylus testing system, such as stylus testing system 100 of FIG. 1. It is to be appreciated that the method 700 may be performed for any number of styluses consecutively or concurrently. However, for ease of reference, the method 700 is described for a single stylus in FIG. 7.

At block 710, the processing logic reads a script. The script may be written by a user or by a process. The script may be read by the processing device from a memory. The script may indicate at least one of a set of tests that are to be performed, an action to be taken if a test is failed (e.g., retry the test), a delay to be taken between tests (e.g., wait a particular amount of time or wait for a user input to continue), or any other instruction. The script may indicate criteria for passing or failing a test. The script may indicate two or more tests that are performed sequentially without user input or interaction between the two or more tests.

At block 720, the processing logic executes the script to perform one or more tests of a stylus. As described in additional detail above with respect to block 620 of FIG. 6A, performing the one or more tests may include determining that the stylus is disposed in a holder above a touch panel that generates position data for each point of contact between the stylus and the touch panel, sending a signal to one or more actuators to move the stylus across a surface of the touch panel, receiving data from the touch panel including at least one of data generated by the touch panel (e.g., position data) or data generated by the stylus (e.g., pressure data or mode data), comparing the received data from the touch panel to reference data to determine operation of the stylus, or any additional steps.

At block 730, the processing logic outputs the results of the one or more tests. The processing logic may output the results of the test over a user interface. The processing logic may output an indication of whether the stylus is functioning properly or is defective. The processing logic may output an indication of which tests were passed and which were failed. The format of the results may be specified by the script. Further, outputting the results of the one or more tests may be performed by executing a portion of the script specifying that results are to be outputted.

Figure 8:
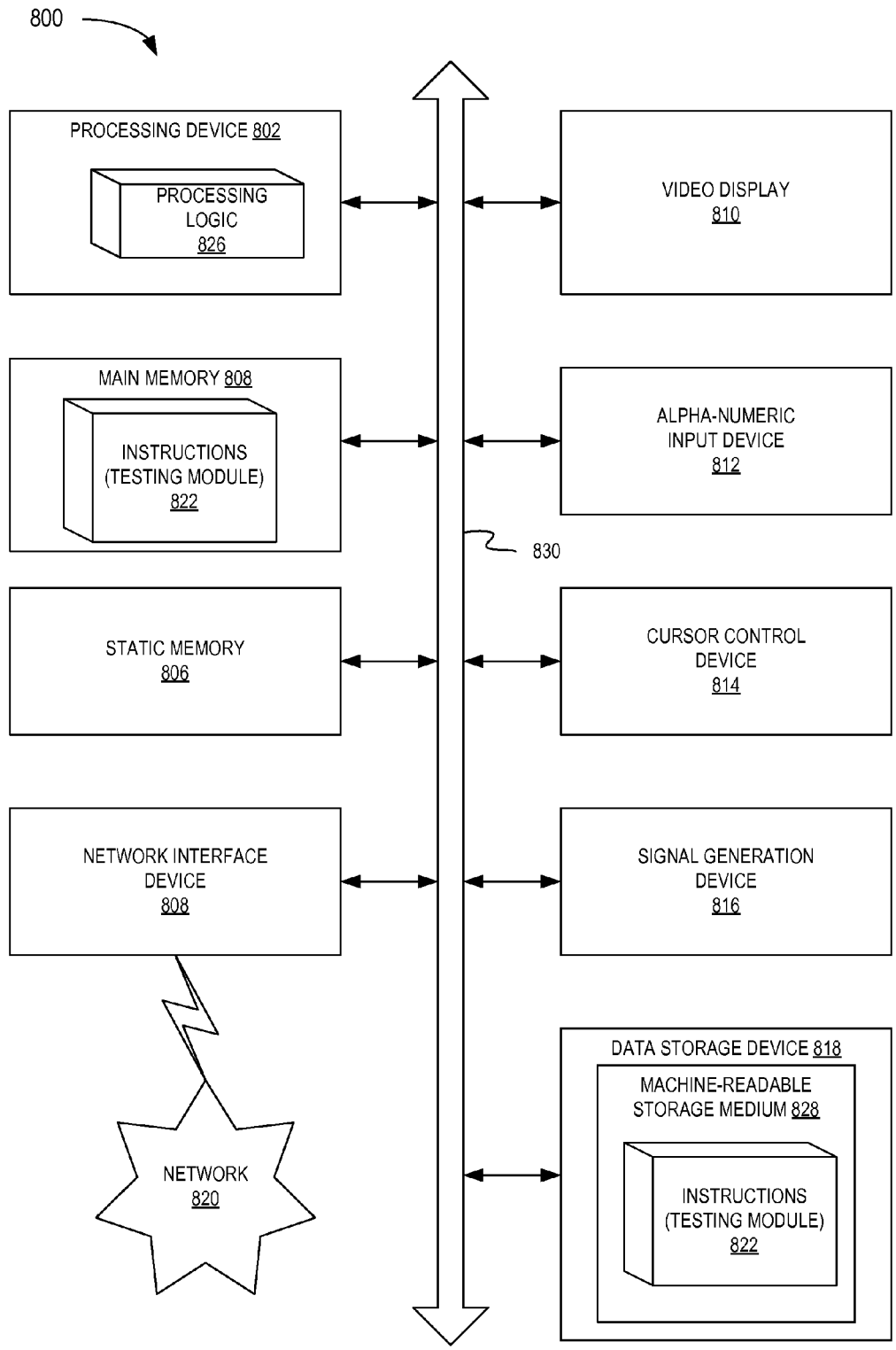
FIG. 8 illustrates a functional block diagram of an exemplary electronic device, in accordance with one embodiment.

FIG. 8 illustrates a diagrammatic representation of a machine in the exemplary form of a computer system 800 within which a set of instructions, for causing the machine to perform any one or more of the methodologies discussed herein, may be executed. The computer system 800 may correspond to the computing device 160 of FIG. 1. The computer system 800 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet or the Internet. The machine may operate in the capacity of a server machine in client-server network environment. The machine may be a personal computer (PC), a set-top box (STB), a server, a network router, switch or bridge or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 800 includes a processing device (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)) and a data storage device 818, which communicate with each other via a bus 830.

The processing device 802 represents one or more general-purpose processing devices such as a microprocessor, central processing unit or the like. More particularly, the processing device 802 may be a complex instruction set computing (CISC) microprocessor, reduced instruction set computing (RISC) microprocessor, very long instruction word (VLIW) microprocessor or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor or the like. The processing device 802 is configured to execute the processing logic 826 for performing the operations and steps discussed herein. For example, the processing logic 826 may include a testing module that performs the methodologies of FIG. 5, FIG. 6A, FIG. 6B, and/or FIG. 7.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and a signal generation device 816 (e.g., a speaker).

The data storage device 818 may include a computer-readable medium 828 on which is stored one or more sets of instructions 822 (e.g., instructions to perform the method 500 of FIG. 5, the method 600 of FIG. 6A, the method 615 of FIG. 6B, or the method 700 of FIG. 7) embodying any one or more of the methodologies or functions described herein. The instructions 822 may also reside, completely or at least partially, within the main memory 804 and/or within processing logic 826 of the processing device 802 during execution thereof by the computer system 800, the main memory 804 and the processing device 802 also constituting computer-readable media. The instructions 822 may further be transmitted or received over a network 820 via the network interface device 808.

While the computer-readable storage medium 828 is shown in an exemplary embodiment to be a single medium, the term "computer-readable storage medium" or "computer-readable medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media and magnetic media.

The preceding description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "generating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions.

The algorithms and displays presented herein are not inherently related to any particular computer or other apparatus. Various general purpose systems may be used with programs in accordance with the teachings herein or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A system for automated testing of a stylus, the system comprising:
    a holder to receive the stylus;
    a detector to detect that the stylus is disposed in the holder;
    an actuator to move the holder;
    a touch panel to generate position data for a plurality of points of contact between the stylus and a surface of the touch panel; and
    a processing device coupled to the detector, the touch panel and the actuator, the processing device to:
        receive a detector signal from the detector indicating that the stylus is disposed in the holder;
        in response to receiving the detector signal, send a first actuator signal to the actuator to move the holder and the stylus across the surface of the touch panel along a linear path;
        receive position data from the touch panel for the plurality of points of contact between the stylus and the touch panel along the linear path; and
        determine that the position data corresponds to the linear path created by the actuator; and
    a mass fixture including one or more masses that are attachable to at least one of the holder or the stylus, wherein the processing device is further to:
        send a second actuator signal to the actuator to position the stylus beneath the mass fixture;
        send a mass fixture signal to the mass fixture to place the one or more masses onto the stylus; and
        receive pressure data from the touch panel indicative of a pressure applied by the stylus to the touch panel responsive to the one or more masses.

2. The system of claim 1, wherein the processing device is further to determine, using the pressure data, whether the pressure applied by the stylus is within a threshold amount of an expected pressure.

3. The system of claim 1, wherein the processing device is further to:
    receive, from the touch panel, mode data generated by the stylus indicative of a sleep mode or a wake mode of the stylus; and
    determine that the mode data indicates that the stylus is functioning properly.

4. A method comprising:
  determining, by a processing device, that a stylus is disposed in a holder, wherein the stylus is positioned above a touch panel that generates position data for a plurality of points of contact between the stylus and the touch panel;
  causing, by the processing device, the holder to move the stylus across a surface of the touch;
  receiving, by the processing device, the position data for the plurality of points of contact between the stylus and the touch panel;
  comparing, by the processing device, the position data to reference data to determine operation of the stylus;
  wherein determining that the stylus is disposed in the holder includes determining that the stylus is disposed in a conductive holder with an active tip in contact with the touch panel:
  sending a first signal to an actuator to move the stylus beneath a mass fixture;
  sending a second signal to the mass fixture to place one or more masses onto the stylus; and
  receiving, from the touch panel, pressure data generated by the stylus from the touch panel indicative of a pressure applied by the stylus to the touch panel with the one or more masses on the stylus.

5. The method of claim 4, wherein determining that the stylus is disposed in the holder comprises determining that the stylus is disposed in a non-conductive holder with a passive tip of the stylus in contact with the touch panel, the method further comprising:
  receiving, by the processing device, first position data for a first point of contact between the passive tip and the touch panel; and
  comparing the first position data to reference position data for the first point of contact.

6. The method of claim 4, wherein determining that the stylus is disposed in the holder comprises determining that the stylus is disposed in a non-conductive holder and wherein the touch panel transmits mode data generated by the stylus, the method further comprising determining that the stylus is not in a wake mode.

7. The method of claim 4, wherein determining that the stylus is disposed in the holder comprises determining that the stylus is disposed in a conductive holder and wherein the touch panel transmits mode data generated by the stylus, the method further comprising:
  receiving, from the touch panel, mode data generated by the stylus; and
  determining that the mode data indicates that the stylus is in a wake mode based on the mode data received from the touch panel.

8. The method of claim 4, wherein determining that the stylus is disposed in the holder comprises determining that the stylus is disposed in a conductive holder with an active tip of the stylus in contact with the touch panel, the method further comprising:
  moving the stylus along a path from a first location on the touch panel to a second location on the touch panel, the active tip being in contact with the touch panel at a first point, a second point, and a third point along the path;
  receiving, from the touch panel, first position data corresponding to the first point, second position data corresponding to the second point, and third position data corresponding to the third point; and
  determining that the first position data, the second position data, and the third position data matches reference data for the first point, the second point, and the third point respectively.

9. The method of claim 8, further comprising determining that the first point, the second point, and the third point lie along a straight line.

10. The method of claim 4, further comprising comparing the pressure data to reference pressure data to determine operation of the stylus.

11. The method of claim 10, wherein the method comprises:
  sending the second signal to the mass fixture to place a first mass onto the stylus;
  receiving, from the touch panel, first pressure data indicative of a first pressure applied by the stylus to the touch panel with the first mass on the stylus;
  sending a third signal to the mass fixture to place a second mass onto the stylus;
  receiving, from the touch panel, second pressure data indicative of a second pressure applied by the stylus to the touch panel with the second mass on the stylus; and
  determining whether the first pressure and second pressure are within threshold amounts of an expected first pressure and expected second pressure.

12. A non-transitory computer-readable medium having instruction encoded thereon which, when executed by a processing device, cause the processing device to perform operations comprising:
  reading, by the processing device, a script; and
  executing, by the processing device, the script to perform one or more tests of a stylus, wherein performing the one or more tests comprises:
    determining that the stylus is disposed in a holder above a touch panel that generates position data for a plurality of points of contact between the stylus and the touch panel;
    sending a signal to one or more actuators to move the stylus across a surface of the touch panel;
    receiving, from the touch panel, at least one of data generated by the touch panel or data generated by the stylus;
    comparing the at least one of the data generated by the touch panel or the data generated by the stylus to reference data to determine operation of the stylus;
    wherein determining that the stylus is disposed in the holder includes determining that the stylus is disposed in a conductive holder with an active tip in contact with the touch panel:
    sending a first signal to an actuator to move the stylus beneath a mass fixture;
    sending a second signal to the mass fixture to place one or more masses onto the stylus; and
    receiving, from the touch panel, pressure data generated by the stylus from the touch panel indicative of a pressure applied by the stylus to the touch panel with the one or more masses on the stylus.

13. The non-transitory computer-readable medium of claim 12, wherein each of the one or more tests is performed automatically without user input or interaction.

14. The non-transitory computer-readable medium of claim 12, wherein the script indicates which of the one or more tests are to be performed, an action to be taken if the one or more tests is failed, or a delay to be taken between a plurality of the one more tests.

15. The non-transitory computer-readable medium of claim 12, wherein the script indicates criteria for passing or failing the one or more tests.

16. The non-transitory computer-readable medium of claim 12, wherein determining that the stylus is disposed in the holder comprises receiving a signal from a detector.

17. The non-transitory computer-readable medium of claim 12, wherein receiving the data generated by the touch panel comprises receiving the position data generated by the touch panel indicative of a location on the touch panel for respective points of contact between the stylus and the touch panel.

18. The non-transitory computer-readable medium of claim 12, wherein performing the one or more tests comprises comparing the pressure data to reference pressure data to determine operation of the stylus.

19. The non-transitory computer-readable medium of claim 12, wherein the script defines two or more tests that are performed sequentially without user input or interaction between the two or more tests.

* * * * *